(12) United States Patent
Zhang et al.

(10) Patent No.: US 8,479,130 B1
(45) Date of Patent: Jul. 2, 2013

(54) METHOD OF DESIGNING INTEGRATED CIRCUIT THAT ACCOUNTS FOR DEVICE AGING

(75) Inventors: Zhichen Zhang, Beijing (CN); Chuanzheng Wang, Beijing (CN)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/607,787

(22) Filed: Sep. 9, 2012

(30) Foreign Application Priority Data

Mar. 7, 2012 (CN) .......................... 2012 1 0057627

(51) Int. Cl.
G06F 9/455 (2006.01)
G06F 17/50 (2006.01)

(52) U.S. Cl.
USPC ........... 716/106; 716/108; 716/109; 716/111; 716/115; 716/139

(58) Field of Classification Search
USPC .................. 716/106–115, 132–136, 139, 122
See application file for complete search history.

(56) References Cited

U.S. PATENT DOCUMENTS

| | | | |
|---|---|---|---|
| 5,533,197 A | 7/1996 | Moran | |
| 5,600,578 A | 2/1997 | Fang | |
| 5,606,518 A | 2/1997 | Fang | |
| 5,615,377 A | 3/1997 | Shimizu | |
| 5,974,247 A | 10/1999 | Yonezawa | |
| 6,024,478 A | 2/2000 | Yamamoto | |
| 6,047,247 A | 4/2000 | Iwanishi | |
| 6,414,498 B2 | 7/2002 | Chen | |
| 6,498,515 B2 * | 12/2002 | Kawakami et al. | 326/121 |
| 6,530,064 B1 | 3/2003 | Vasanth | |
| 6,634,015 B2 * | 10/2003 | Lee et al. | 716/108 |
| 7,219,045 B1 * | 5/2007 | Wu et al. | 703/14 |
| 7,567,891 B1 * | 7/2009 | Liu et al. | 703/13 |
| 7,689,377 B2 * | 3/2010 | Jain et al. | 702/117 |
| 7,835,890 B2 | 11/2010 | Wu | |
| 8,161,428 B2 * | 4/2012 | Yokogawa | 716/56 |
| 2001/0029600 A1 * | 10/2001 | Lee et al. | 716/17 |
| 2002/0140460 A1 * | 10/2002 | Kawakami et al. | 326/121 |
| 2012/0117528 A1 * | 5/2012 | Heaps et al. | 716/136 |
| 2012/0266123 A1 * | 10/2012 | Jain et al. | 716/112 |

OTHER PUBLICATIONS

Kawakami, Y.; Jingkun Fang; Yonezawa, H.; Iwanishi, N.; Lifeng Wu; I-Hsien Chen, A.; Koike, N.; Ping Chen; Chune-Sin Yeh; Zhihong Liu; , "Gate-level aged timing simulation methodology for hot-carrier reliability assurance," Design Automation Conference, 2000. Proceedings of the ASP-DAC 2000. Asia and South Pacific , vol., No., pp. 289-294, 9-9 Jun. 2000.

* cited by examiner

Primary Examiner — Nha Nguyen
(74) Attorney, Agent, or Firm — Charles Bergere

(57) ABSTRACT

A method of designing an integrated circuit (IC) includes simulating aging evolution of the IC by providing a standard cells library, and a device activity file of device electrical activity in the standard cells as a function of electrical activity at the pins of the standard cells, taking into account Hot Carrier Injection, Negative Bias Temperature Instability, and gate oxide breakdown. A standard cell evolution file is provided that stores electrical characteristic aging data of standard cells. An instance activity file is provided of simulated electrical activity at the pins of individual instances of the cells in the IC. The instance activity file and the device activity file are used to analyze device activity and consequent aging evolution of the devices, and then generate data for consequent aging evolution of the IC. The IC design can then be modified to account for the aging evolution.

14 Claims, 2 Drawing Sheets

METHOD OF DESIGNING INTEGRATED CIRCUIT THAT ACCOUNTS FOR DEVICE AGING

BACKGROUND OF THE INVENTION

The present invention is directed to semiconductor integrated circuit design, and more particularly, to semiconductor integrated circuit design that accounts for aging reliability of devices used in the circuit design.

Semiconductor devices are subject to various phenomena that degrade their performance with use and over time. With the evolution of manufacturing process technology, feature sizes have gotten smaller, currently down to tens of nanometers, which accentuate such degradation. Among such phenomena are hot carrier injection (HCI), negative bias temperature instability (NBTI) and time-dependent dielectric (gate oxide) breakdown (TDDB). The resulting changes in device characteristics change the circuit performance and may cause the circuit to fail. Thus, there is a need for simulation of the effects of the phenomena at the design stage of an integrated circuit (IC) to check and analyze the reliability issues and enable the design to be modified, if necessary.

Very large scale integrated circuits (VLSI) may include several hundreds of millions of semiconductor devices. The design and manufacture of VLSI typically makes use of computer aided design tools and programs that integrate synthesis, placement, and routing algorithms with simulation of performance and behavior of the IC and analysis flows for design closure. A known analog simulator is the 'Simulation Program with Integrated Circuit Emphasis' (SPICE) and known digital simulators are based on Verilog and VHDL (Very High Speed IC Hardware Description Language).

Electronic design automation (EDA) tools often use standard cell methodology, in which standard cells of different kinds are compiled in a library. Each standard cell defines a layout and certain characteristics (the schematic view) for a respective logic or storage function (the logical view). The schematic view usually provides a netlist, which is a nodal description of devices (individual transistors or connected groups of transistors or storage devices), of their connections to each other in the cell, and of the pins of the standard cell for connecting the cell to other cells and to the external environment. A simulator may then simulate the electronic behavior of the netlist, including parameters such as power consumption, timing and signal propagation delay, as a function of defined input signals, including the resistance, capacitance and inductance effects of interconnections.

The full IC layout is typically defined by a logic synthesis tool that transforms the register-transfer level (RTL) description of the IC into a floor plan netlist using the technology-dependent netlists in the standard cell library, place and route (PNR) tools that then position and connect instances of standard cells of chosen sizes together with design-specific cells, and RC extraction, which calculates the electrical characteristics of inter-connections. The definition of the resulting IC layout is then verified by validation tools, such as Design Rule Check (DRC), Parasitic EXtraction (PEX) and Layout Vs Schematic (LVS), iterating as necessary with the PNR tool.

A standard cell library is a collection of multiple definitions of the same standard logic functions, such as gates, inverters, flip-flops, latches and buffers, in different cell areas and speeds typically of the same height and various widths. A typical standard-cell library contains two main components: a Library Database often including layout, schematic, symbol, abstract, and other logical or simulation views, and a Timing Abstract providing functional definitions, timing, power, and noise information for each cell. The layout data may be saved in a number of formats such as the Cadence Design Exchange Format ('.def') and Library Exchange Format ('.lef'), in accordance with American Standard Code for Information Interchange (ASCII), and the Synopsys Milky Way format. The timing abstract may be stored in Synopsis Liberty format, for example.

Simulating the behavior of the netlist of a VLSI at the device level involves large amounts of data and processing even for the characteristics of the individual devices when fresh (unused). Calculating the usage and hence the aging of the component devices individually to calculate the resulting performance characteristics of the aged VLSI would compound the volume of data and processing. It has been proposed to simplify the aging calculations by performing the calculations at cell level, from the layout, taking account of HCI effects only, and extrapolating the cell fresh slew rate by a ratio of expected degradation, to obtain the consequences for timing only. However, this proposal of simulation is not sufficiently flexible or accurate, does not take account of other aging phenomena, and does not enable simulation of the consequences at VLSI for other performance characteristics, such as power and thermal effects, which it only analyzes in the fresh condition.

BRIEF DESCRIPTION OF THE DRAWINGS

The present invention is illustrated by way of example and is not limited by embodiments thereof shown in the accompanying figures, in which like references indicate similar elements. Elements in the figures are illustrated for simplicity and clarity and have not necessarily been drawn to scale.

DETAILED DESCRIPTION OF PREFERRED EMBODIMENTS

Figure 1:
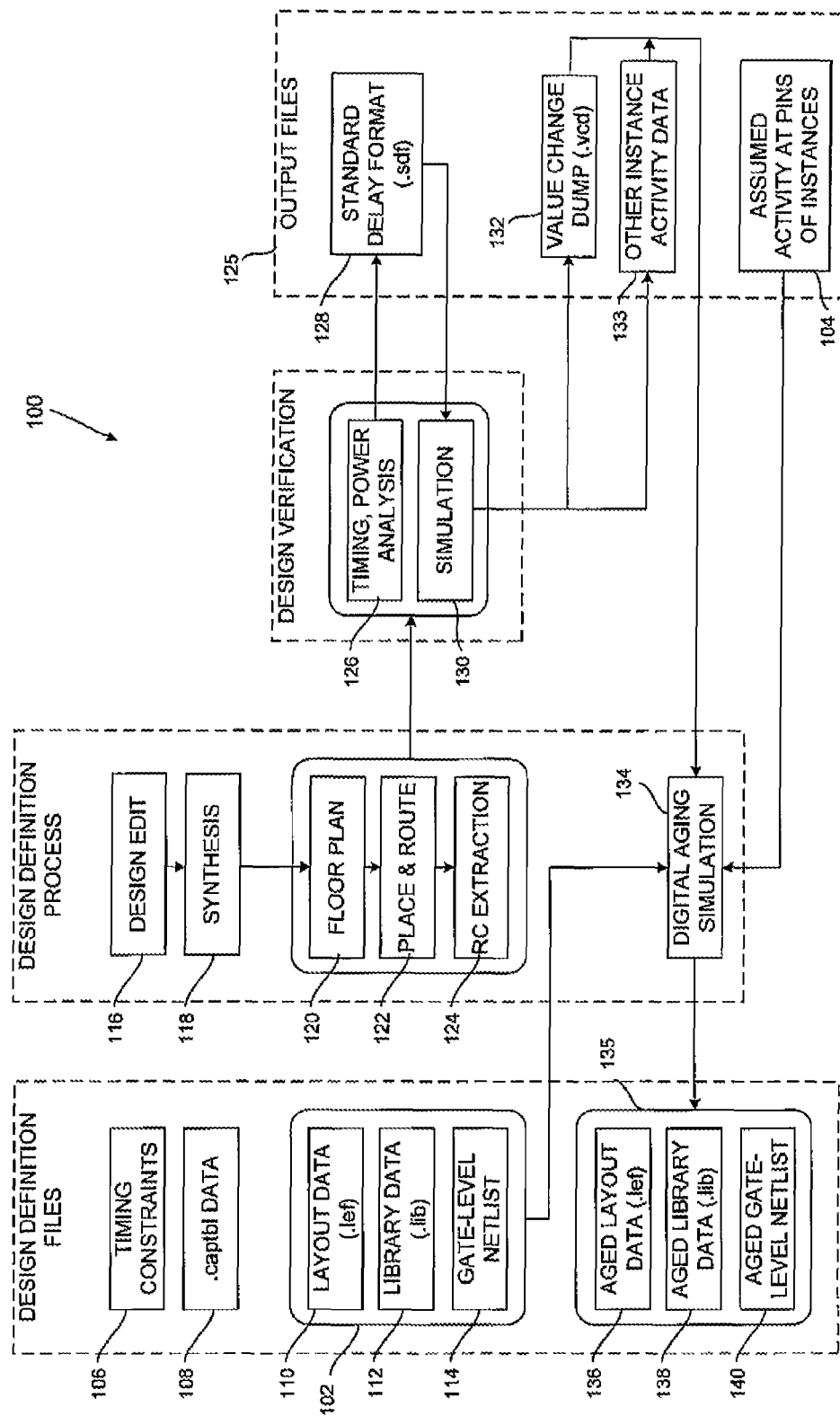
FIG. 1 is a schematic block diagram of a method of designing an IC in accordance with one embodiment of the invention, given by way of example, showing interaction between design process steps and data files for simulation of aging of the IC.
Figure 2:
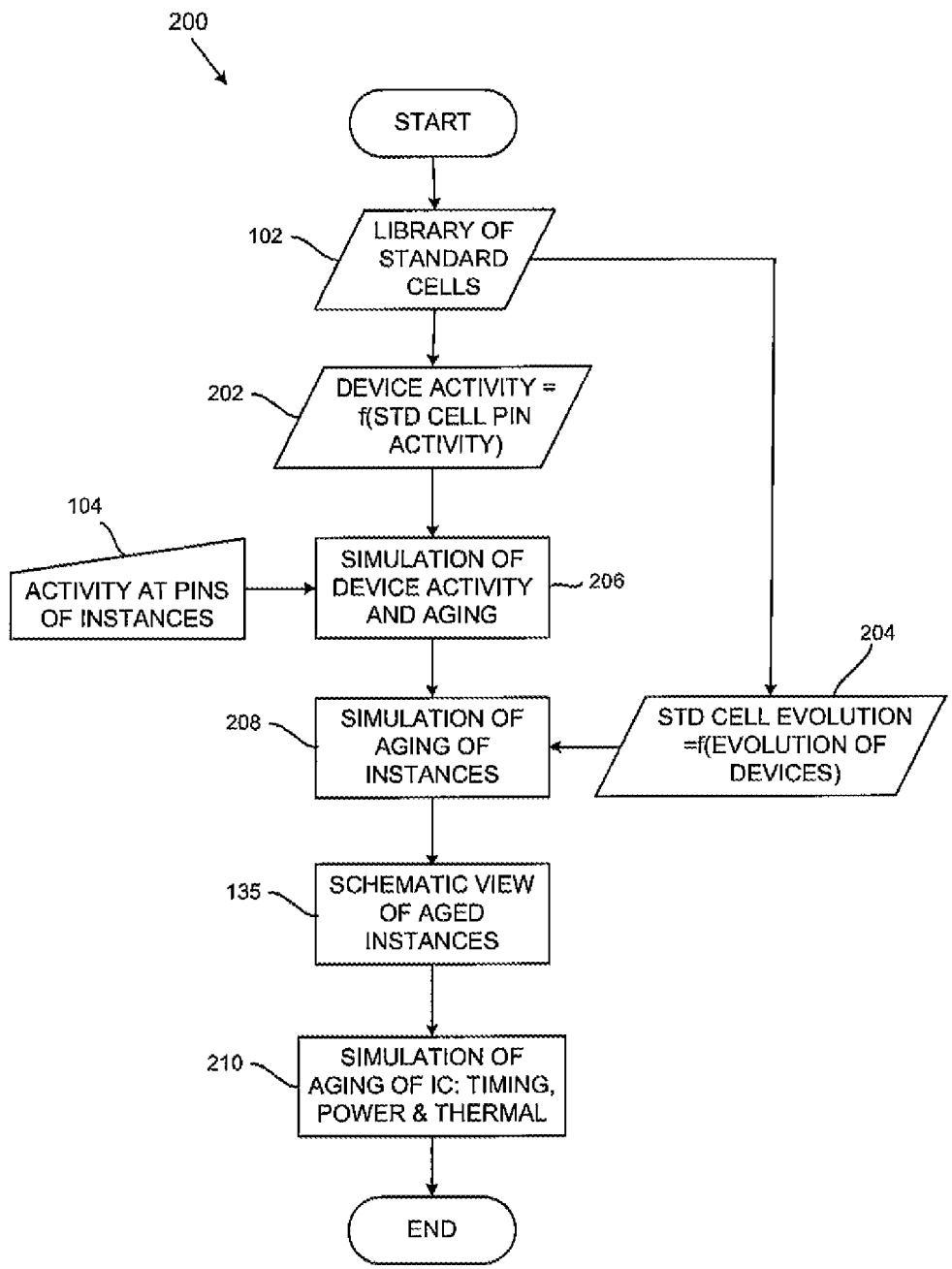
FIG. 2 is a flow chart of a process for simulating aging evolution of the performance of the IC in the method of FIG. 1.

FIG. 1 illustrates a method 100 of designing a semiconductor integrated circuit (IC) in accordance with one example of an embodiment of the invention, and FIG. 2 illustrates an example of a process 200 for simulating aging evolution of the performance of the IC in the method 100. As will be understood by those of ordinary skill in the art, the methods and steps discussed herein are performed on a computer executing programs that are commercially available and used for integrated circuit design, e.g., CAD and EDA tools. As such tools are well known and since it is known that today's ICs cannot be designed by hand or mental steps without the aid of a computer and IC design software, these aspects of the invention are only discussed in the detail necessary for a particular step or operation on a particular file. The method 100 includes providing a library 102 of standard cells each having respective definitions of inter-connected devices and pins for connection to other cells and/or ports, the library containing layout and performance data for respective cells. The method 100 includes providing a device activity file (DAF) 202 that contains electrical activity of devices in the respective standard cells as a function of electrical activity at the pins of the standard cells; the DAF 202 may be part of the library file 102. A standard cell evolution file (SCEF) 204 is provided that contains evolution of electrical characteristics of respective standard cells as a function of aging evolution of electrical characteristics of devices in the standard cells; the SCEF 204 may be part of the library file 102. An instance activity file (IAF) 104 is provided simulating electrical activity at the pins of individual instances of the cells in the IC. The IAF 104 and the DAF 202 are used to provide a simulation 206 of activity of the devices in the IC and consequent aging evolution of electrical characteristics of the devices. The SCEF 204 and the simulation 206 of consequent aging evolution of electrical characteristics of the devices are used to generate data 208 for consequent aging evolution of electrical characteristics of the instances. The data 208 for consequent aging evolution of electrical characteristics of the instances is used to generate data 210 for consequent aging evolution of electrical characteristics of the IC.

In an embodiment of the invention, a method of making an IC includes designing the IC by the method 100 and using the design to make an IC. In an embodiment of the invention a non-transitory computer readable medium has a computer program element thereon that is executable by a data processor in performing the method 100.

In more detail, the method 100 of designing an IC includes providing design definition files including timing constraint data 106 defining timing conditions that are to be fulfilled, and .captbl data 108 defining capacitance and other impedance data extracted from the layout. The standard cell library 102 includes layout data 110, which may be in .lef Library Exchange Format, library data 112, which may be in .lib Library Format, and a gate-level netlist 114.

The design definition process may include a design edit stage 116 that provides a register-transfer level ('RTL') description of the IC and a synthesis stage 118 that transforms the RTL description into a floor plan netlist using instances of the standard cells, together with design-specific cells if desired, and the interconnections of the pins of the cells. The synthesis operation may be followed by a floor plan stage 120, a place and route stage 122 that positions each instance of the cells in the floor plan and the signal and power connections, and an RC extraction stage 124 that calculates electrical characteristics of the inter-connections. The resulting data may be stored in the standard cell library 102 including the gate level netlist 114.

The design verification process produces output files 125. The design verification process may include Design Rule Check (DRC), Parasitic EXtraction (PEX) and Layout Vs Schematic (LVS) stages (not shown). Analysis of parameters including timing, power and thermal characteristics in a stage 126 may produce data in a standard delay format ('.sdf') file 128. Simulation of the static and dynamic performance of the IC in a stage 130 may produce data in a value change dump ('.vcd') format file 132 and data for other simulated instance activity in various formats in files 133.

The resulting data initially relates to the performance of the IC in its fresh state. Data from the IAF 104 simulating assumed electrical activity at the pins of individual instances of the cells during the life of the IC is then used together with data from the layout file 110, the standard cell library 112, the gate-level netlist 114, and the .vcd format file 132 in a digital aging simulation stage 134. The digital aging simulation stage 134 generates an aged schematic view 135, including an aged layout file 136, an aged standard cell library 138, and an aged gate-level netlist 140, in the same formats as the fresh files 110, 112 and 114 and using aged names relating to the fresh instance names. The aged files 136, 138 and 140 are then used in the design verification stages 126 and 130 to generate the data for aging evolution of electrical characteristics of the IC, including aged timing, power, thermal and other characteristics for example.

The example of the process 200 for simulating aging evolution of the performance of the IC includes generating the DAF 202, which stores electrical activity of devices in the respective standard cells as a function of electrical activity at the pins of the standard cells. The data of the DAF 202 is dependent on manufacturing technology and can be released with the digital standard cell library 102. For each standard cell, the DAF 202 contains the name of the standard cell, the names of the input and output pins of the cell, the status of the pins in different operating conditions and for each operating condition that devices in the standard cell are working.

The process 200 also includes generating the SCEF 204 that stores evolution of electrical characteristics of respective standard cells as a function of aging evolution of electrical characteristics of devices in the standard cells. The data of the SCEF 204 is dependent on manufacturing technology and can be released with the digital library 102 of standard cells. For each standard cell, the SCEF 204 contains the name of the standard cell and the weight of the aging evolution of characteristics of each device in the cell in the aging evolution of characteristics of the cell.

The IAF 104 is generated simulating electrical activity at the pins of individual instances of the cells in the IC as a function of assumed static and dynamic activity of the IC over the specified life of the IC. The IAF 104 may have switch numbers and mark-space ratios for each instance of cells in the IC. The IAF 104 may be saved in .vcd format. The generation of the IAF 104 may be performed by scripts. The user may assume a design work status for design static activity, including electrical biasing of the devices, or alternatively may dump design static activity data into a .vcd file. The user may dump design dynamic activity data into a .vcd file as input based on actual simulation of the design. Parallel data processing may be performed to process the large amount of data. From the activity data of the pins, the switch number and mark-space ratio of the input and output pins of each instance are calculated for the IAF 104.

The IAF 104 and the DAF 202 are used to provide a simulation 206 of activity of the devices in the IC over the life of the IC and consequent aging evolution of electrical characteristics of the devices. The switch number and mark-space ratio of the pins of each of the instances of cells in the IC are used to obtain the switch number and mark-space ratio of the devices within each instance. When the relationship between the standard cell pin status and the device pin status are known, the switch number and mark-space ratio of the pins of each device are calculated from the IAF 104 based on this instance information. The device activity data generated by the simulation 206 is used to calculate the expected aging evolution of the electrical characteristics of the devices. The aging evolution of timing data for each device may be based on the device aged slew rate and load capacitance. The aging evolution of the characteristics of each device is calculated in this example for the effects of hot carrier injection (HCI), negative bias temperature instability (NBTI), time-dependent dielectric breakdown (TDDB) and other suitable SPICE model parameters, based on the switch number and mark-space ratio of the pins of the devices. The effects may be merged, so that the cumulative effect of the different phenomena is simulated. The effects of HCI, NBTI, TDDB and other phenomena may be simulated simultaneously or separately. The simulation 206 may be performed by scripts. When the user defines the reliability stress time using intrinsic formulae, the effects on each device may be calculated. The data for the aging evolution of electrical characteristics of each device is output.

The SCEF 204 and the simulation 206 of consequent aging evolution of electrical characteristics of the devices are used to generate data 208 for consequent aging evolution of electrical characteristics of each of the instances. The generation of the data 208 may be performed by scripts.

The aged library data 138 for each instance are then generated based on their aged characteristics. The fresh gate-level netlist 114 and layout data files 110 are translated into the corresponding aged gate-level netlist 140 and aged layout data files 136 for the aged instances, resulting in the schematic view 135 of the aged IC. These aged files can be used in the general digital design verification stages 126 and 130 to generate aged output files 125 for aged timing, power, thermal and other advanced analysis. The generation of the files 136, 138 and 140 may be performed by scripts. Parallel data processing may be performed to process the large amount of data. The aged library data 138 are generated using the corresponding standard cell of each instance and substituting the aged electrical characteristics of each of the instances for the fresh characteristics to obtain the aged timing, power and other information are calculated by using fresh timing library and the instance damages generated. The schematic view 135 of the aged instances is used to generate data 210 to obtain the consequent aging evolution of electrical characteristics of the IC.

It will be appreciated that the method 100 and process 200 offers a flexible and accurate simulation that can take account of various aging phenomena, and that can simulate the consequences for various performance characteristics, not just timing. The method 100 provides a system including models, methods and software for reliability analysis for digital circuits. During the digital design stages, the method 100 calculates the evolution of the electrical characteristics of each device within each instance caused by HCI, NBTI and other reliability effects during burn-in, stress time and product operating time based on expected biasing voltage, temperature and dynamic switching activities during the life of the digital circuit. Because the calculation is at the device level, the analysis accuracy is high. The method 100 enables the effects of different reliability phenomena to be merged and obtain the cumulative aged analysis. The method 100 supports different desired digital timing library based analysis for the aged design, such as the timing, power, thermal analysis and others. Users can start the aged analysis from any digital design stage, such as synthesis, floor plan or place & route. The method 100 can generate the aged SDF file 128 for aged simulation. Based on the comparison of fresh and aged design analysis or simulation, designers can debug and/or modify the design to account for expected aging issues.

The invention may be implemented in wholly or partially in a computer program for execution on a computer system, at least including code portions for performing steps of a method according to the invention when run on a programmable apparatus, such as a computer system or enabling a programmable apparatus to perform functions of a device or system according to the invention. A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In the foregoing specification, the invention has been described with reference to specific examples of embodiments of the invention. It will, however, be evident that various modifications and changes may be made therein without departing from the broader spirit and scope of the invention as set forth in the appended claims. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

In the claims, use of the words 'comprising,' 'including,' or 'having' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of designing a semiconductor integrated circuit ('IC'), including:
    providing a library of standard cells each having respective definitions of inter-connected devices and pins for connection to other cells and/or ports, the library containing layout and performance data for respective cells;

providing a device activity file (DAF) of electrical activity of devices in the respective standard cells as a function of electrical activity at the pins of the standard cells;

providing a standard cell evolution file (SCEF) evolution of electrical characteristics of respective standard cells as a function of aging evolution of electrical characteristics of devices in the standard cells;

providing an instance activity file (IAF) simulating electrical activity at the pins of individual instances of the cells in the IC;

using said IAF and said DAF to provide a simulation of activity of said devices in the IC and consequent aging evolution of electrical characteristics of said devices;

using said SCEF and said simulation of consequent aging evolution of electrical characteristics of said devices to generate data for consequent aging evolution of electrical characteristics of said instances;

using said data for consequent aging evolution of electrical characteristics of said instances to generate data for consequent aging evolution of electrical characteristics of the IC, wherein generating data for consequent aging evolution of electrical characteristics of said instances includes generating a schematic view of aged instances corresponding to a schematic view of fresh instances and using said schematic view of the aged instances in generating data for consequent aging evolution of electrical characteristics of the IC, wherein said generating the consequent aging evolution data is performed by a computer; and wherein simulating said electrical activity in said IAF includes providing numbers of electrical switching and of mark-to-space ratios at the pins of individual instances of the cells in the IC.

2. The method of claim 1, wherein said DAF contains electrical activity of devices in the respective standard cells as a function of electrical biasing of the devices and electrical dynamic activity at the pins of the standard cells.

3. The method of claim 1, wherein providing a simulation of activity of said devices in the IC includes using said numbers of electrical switching and of mark-to-space ratios at the pins of individual instances to provide numbers of electrical switching and of mark-to-space ratios at the pins of individual devices in the instances.

4. The method of claim 1, wherein said simulation of consequent aging evolution of electrical characteristics of said devices includes simulation of effects of hot carrier injection on said electrical characteristics of said devices.

5. The method of claim 1, wherein said simulation of consequent aging evolution of electrical characteristics of said devices includes simulation of effects of negative bias temperature instability on said electrical characteristics of said devices.

6. The method of claim 1, wherein said simulation of consequent aging evolution of electrical characteristics of said devices includes simulation of effects of time-dependent dielectric breakdown on said electrical characteristics of said devices.

7. The method of claim 1, wherein said data for consequent aging evolution of electrical characteristics of the IC includes data for aging evolution of timing, power and thermal characteristics of the IC.

8. A method of making a semiconductor integrated circuit ('IC') including designing the IC by the method of claim 1, and using the design to fabricate an IC.

9. A non-transitory computer readable medium with a computer program element stored thereon that is executable by a data processor in a method of designing a semiconductor integrated circuit (IC) using a library of standard cells each having inter-connected devices and pins for connection to other cells, the library containing layout and performance data for respective cells, a device activity file (DAF) of stored electrical activity of devices in the respective standard cells as a function of electrical activity at the pins of the standard cells, a standard cell evolution file (SCEF) of stored evolution of electrical characteristics of respective standard cells as a function of aging evolution of electrical characteristics of devices in the standard cells, and an instance activity file (IAF) of simulation electrical activity at the pins of individual instances of the cells in the IC, the computer program element comprising instructions for:

using said IAF and said DAF to provide a simulation of activity of said devices in the IC and consequent aging evolution of electrical characteristics of said devices;

using said SCEF and said simulation of consequent aging evolution of electrical characteristics of said devices to generate data for consequent aging evolution of electrical characteristics of said instances;

using said data for consequent aging evolution of electrical characteristics of said instances to generate data for consequent aging evolution of electrical characteristics of the IC, wherein generating data for consequent aging evolution of electrical characteristics of said instances includes generating a schematic view of aged instances corresponding to a schematic view of fresh instances and generating data for consequent aging evolution of electrical characteristics of the IC; and wherein simulating said electrical activity in said instance activity file includes providing numbers of electrical switching and of mark-to-space ratios at the pins of individual instances of the cells in the IC.

10. The non-transitory computer readable medium of claim 9, wherein providing a simulation of activity of said devices in the IC includes using said numbers of electrical switching and of mark-to-space ratios at the pins of individual instances to provide numbers of electrical switching and of mark-to-space ratios at the pins of individual devices in the instances.

11. The non-transitory computer readable medium of claim 9, wherein said simulation of consequent aging evolution of electrical characteristics of said devices includes simulation of effects of hot carrier injection on said electrical characteristics of said devices.

12. The non-transitory computer readable medium of claim 9, wherein said simulation of consequent aging evolution of electrical characteristics of said devices includes simulation of effects of negative bias temperature instability on said electrical characteristics of said devices.

13. The non-transitory computer readable medium of claim 9, wherein said simulation of consequent aging evolution of electrical characteristics of said devices includes simulation of effects of time-dependent dielectric breakdown on said electrical characteristics of said devices.

14. The non-transitory computer readable medium of claim 9, wherein said data for consequent aging evolution of electrical characteristics of the IC includes data for aging evolution of timing, power and thermal characteristics of the IC.

* * * * *